Aug. 10, 1926.

H. SCHJOTZ ET AL 1,595,879

AUTOMOBILE HEADLIGHT CONTROL

Filed April 19, 1924    2 Sheets-Sheet 1

WITNESSES:

INVENTORS,
HAROLD SCHJOTZ
CHRISTIAN STAUGAARD
F SCHLUETER.
BY
ATTORNEYS.

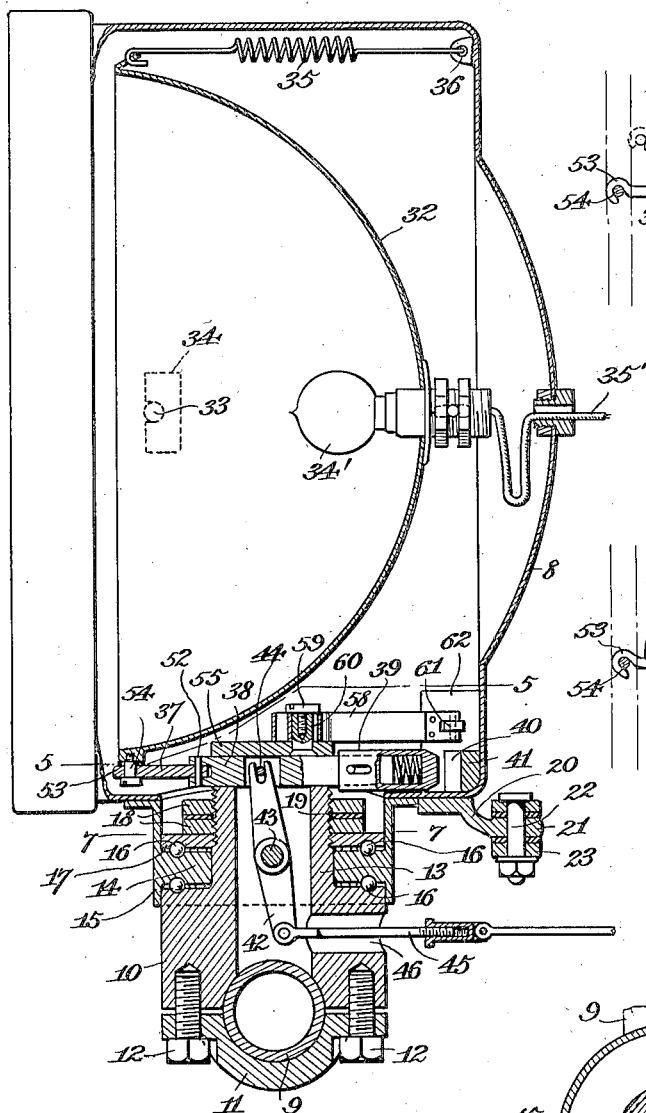

Patented Aug. 10, 1926.

1,595,879

UNITED STATES PATENT OFFICE.

HAROLD SCHJOTZ, CHRISTIAN STAUGAARD, AND FREDRICK SCHLUETER, OF DETROIT, MICHIGAN.

AUTOMOBILE HEADLIGHT CONTROL.

Application filed April 19, 1924. Serial No. 707,736.

This invention relates to automobile headlight controls, an object of the invention being to so construct and mount the headlights of an automobile that the headlights will turn in the direction of movement of the car so as to throw the light in the direction of the turn.

A further object is to provide improved operating means for the headlights directly controlled by the movement of the steering wheel and which functions to throw the light in the direction of turning and also to cause the lights while the car is turning to throw the beams more directly on the ground.

A further object of the invention is to provide horizontally or laterally movable or pivoted headlights having reflectors therein which are pivoted and which can be tilted so as to throw the light downwardly, straight ahead, or forwardly, or upwardly in accordance with the desire of the driver.

A further object is to provide a headlight control which may be entirely automatic or partially manual in accordance with the desire of the user.

With these and other objects in view, the invention consists in certain novel features of construction and combinations and arrangements of parts which will be more fully hereinafter described and pointed out in the claims.

In the accompanying drawings—

Figure 4 is a view in longitudinal section through a headlight and its mounting;

Figure 5 is a fragmentary view in horizontal section on the line 5—5 of Figure 4;

Figure 6 is a view in horizontal section taken at a point just below the line 5—5, with the cap plate of the pilot removed;

Figure 7 is a view in transverse section on the line 7—7 of Figure 4;

Figure 8 is a diagrammatic view illustrating the arcs of movement of the headlight proper and the reflector within the same.

Figure 1:
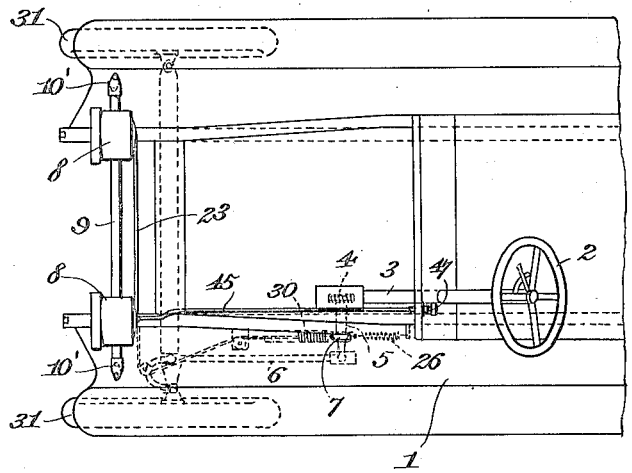
Figure 1 is a plan view illustrating our improved headlights in operative position on an automobile.
Figure 3:
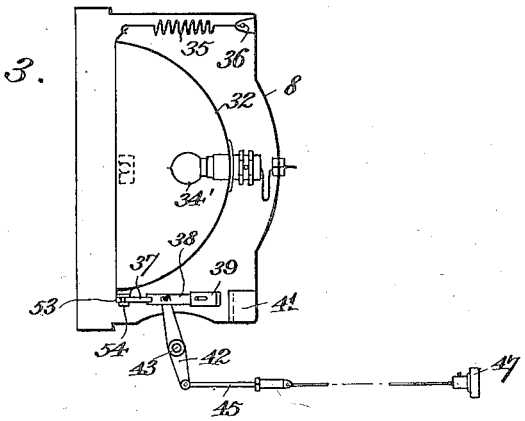
Figure 3 is a diagrammatic view in vertical section through one of the headlights and illustrating the tilting mechanism of the reflector.

1 represents an automobile provided with the ordinary steering wheel 2 and post 3. This post 3, as is customary, permits motion through gears 4 to a rocker shaft 5 and the latter is connected by a rod 6 with the steering mechanism of the automobile so as to control the movement of the car by the turning of the steering wheel.

On this rocker shaft 5 we provide a normally vertical arm 7 to automatically turn our improved headlights 8, as will more fully hereinafter appear. Both of the headlights are constructed and mounted alike and hence the description of one will apply alike to both.

A rod 9, which may be tubular if desired, is positioned transversely of the car frame at its forward end and secured in suitable brackets 10' in the fenders of the car, or to any other portion of the frame where a rigid support may be had. On a rod 9 we secure posts 10 for the respective headlights 8.

By reference particularly to Figure 4, it will be seen that the post 10 is clamped to the rod 9 preferably by providing a separable bearing bracket 11 at the bottom of the post and securing the same to the post by screws 12. The post is of general tubular form having a reduced journal 13 at its upper end around which a bearing 14 is mounted to turn. This bearing 14 constitutes an integral portion of a sleeve 15, and antifriction bearings 16 are mounted above and below the bearing so as to reduce friction to a minimum. The upper ball race of the upper antifriction bearing 16 constitutes a collar or nut 17 which is screwed onto the threaded upper end of the journal 13, and nuts 18 with interposed washers 19 between them are screwed onto the threaded upper end of the journal to hold the parts in normal position.

The headlight 8, or more specifically the casing thereof, is fixed to the upper end of the sleeve 15 so that the headlight can turn freely on the pivot. Each headlight has a rearwardly projecting arm 20 fixed thereto and having an eye 21 at its rear end which is connected by a pivot bolt 22 with a link 23 connecting the two headlights. One end of this link 23 is connected by a wire, cable or other flexible connecting device 24 with a clamping collar 25 on the arm 7 above referred to.

A coil spring 26 connects a fixed post 27 with the other side of the collar 25 to balance the movement of the arm. This flexible device 24 is passed around suitably located pulleys 28 and 29 and is provided between its ends with a compensating spring 30. This spring 30 is of a strength far in excess of the strength of any of the elastic parts described and hereinafter to be described so that it does not function as a spring except when the headlights are locked against turning movement, then this spring allows the collar 25 to move without doing any damage to its connections. It is through the medium of the parts above described that lateral or horizontal pivotal movement is imparted to the headlights to cause them to turn with the front wheels, indicated by the reference numeral 31, which are turned by the action of the steering wheel 2.

In each headlight a reflector 32 is located and supported by trunnions 33 in brackets 34 in the headlight casings. It will be noted that these trunnions 33 are horizontal and at opposite sides of the reflector to allow the reflector pivotal movement, as will be explained. An electric lamp 34' is mounted in the reflector and wires 35' leading thereto have sufficient slack within the headlight casing to allow of independent movement of the reflector, as will be understood.

The upper end of the reflector 32 is connected by a coil spring 35 to an eye 36 at the back of the headlight casing; and this spring tends to tilt the reflector so as to throw light at an upward incline when permitted. The lower end of the reflector 32 is connected by a link 37 with a plunger 38 mounted to move transversely through suitable openings in the upper end of the post. This plunger 38 carries a spring-pressed key 39 which may be moved into a keyway 40 in a block 41 fixed to the headlight casing so as to prevent turning movement of the headlight relative to the post.

This plunger 38 is caused to move by a lever 42 located in the hollow post pivotally supported between its ends as shown at 43. The upper end of this lever 42 has a slot and pin connection, as shown at 44, with the plunger 38, and the lower end of the lever has a rod 45 connected thereto and extending through an opening 46 in the post. This rod may, of course, be operated in various ways to manually control the movement of the plunger 38 and the tilting movement of the reflector, and we have illustrated a simple form of operating means embodying a knob 47 connected to a sleeve 48 held against longitudinal movement on the rod and provided with a pin 49 moving in a cam slot 50 in a fixed sleeve 51 so that by turning this knob a longitudinal movement will be imparted to the rod 45 to swing the lever 42 and move the plunger 38. As above stated, however, the particular means for operating this plunger and tilting the reflector can be varied to suit the trade.

It will be noted that when this plunger 38 is moved rearwardly it will be locked in engagement with the block 41 and will prevent turning movement of the headlight on the post, so that whenever it is desired to prevent this automatic turning movement it can be stopped by moving the plunger into locked position. Furthermore, the movement of the plunger can be utilized to tilt the reflector manually whenever desired.

Particular attention is called to the construction and mounting of the link 37. This link is pivotally connected at its inner end to the plunger 38, as shown at 52, so as to allow it to swing freely in a horizontal plane, while the outer end of the link constitutes a hook 53 engaging a pin 54 on the reflector 32.

A cap plate 55 is secured to the upper end of the post 10, preferably by means of screws 56 and dowel pins 57, and supports the convolute end of a spring 58. This support for the spring may constitute a screw 59 which is fixed in a stud or post 60 so as to prevent pivotal movement of the spring. The spring 58 at its free end carries a roller 61 engaging an angle arm 62 on the headlight casing 8. As both of the headlights are constructed alike the arms 62 will engage the spring arms 58 and move said spring arms to an abnormal position whenever the headlights are laterally turned, and these spring arms will return the headlight to normal position and tend to swing them in an opposite direction when permitted.

The headlight casing when turned or pivoted carries with it the reflector 32 but, as the link 37 swings on the pivot 52 and moves in a different arc from the arc of movement of the headlight casing, it will cause the reflector 32 to tilt so as to throw the light downwardly.

Figure 8 illustrates diagrammatically the different arcs of movement. The point 52 represents the pivotal mounting of the link 37, and the point $x$ represents the center of the post which constitutes the pivot of the headlight casing. Hence it will be seen that whenever the headlights are moved so as to swing with the steering wheels, a downward tilt to each bolt of light is given. This is desirable as in taking a turn it is advisable that the driver may have a clear vision of the ground at the turn, and it prevents a direct glare of the light to drivers approaching from the opposite direction.

Figure 2:
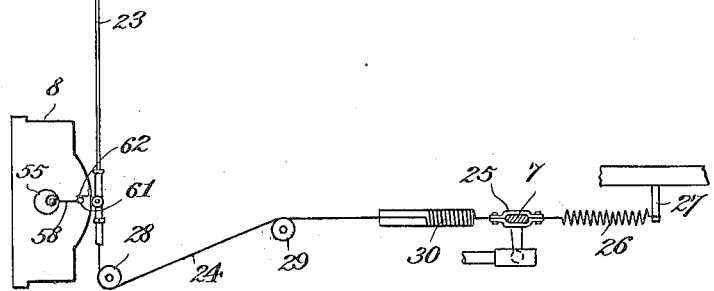
Figure 2 is a diagrammatic plan view showing the headlights and their controlling means.

The operation is as follows:

The parts illustrated in Figure 2 may be straight as a normal position, and when the steering wheel 2 is turned to steer the vehicle to the right the arm 7 through the medium of the flexible connecting device 24 and rod 23 causes both headlight casings to swing on the posts 10. In doing this the spring arms 58 are swung to the left, as shown in dotted lines in Figure 5, and the reflectors 32 are caused to tilt within the headlight casings. When the wheels are straightened or swung to the left an opposite movement takes place due to the action of the spring arms 58.

Whenever it is desired to lock the headlights against pivotal movement, the plunger 38 is manually operated to move the same in locked engagement with the block 41 to prevent injury to the parts. When the headlights are thus locked, the compensating spring 30 permits the arm 7 to move without imparting motion to the headlight operating means and without breaking any of the connecting mechanism.

Various slight changes and alterations might be made in the general form of the parts described without departing from our invention, and hence we do not limit ourselves to the precise details set forth but consider ourselves at liberty to make such slight changes and alterations as fairly fall within the spirit and scope of the appended claims.

We claim:

1. The combination with an automobile, a rod fixed to the automobile, hollow posts fixed to the rod, headlight casings having rotary mounting on the posts, devices connecting the headlight casings and causing them to move together, means operated by the steering mechanism to cause pivotal movement of the headlights on the posts, reflectors in the headlights having horizontal trunnions at their opposite sides mounted in the headlights, springs connecting the upper portions of the reflectors with the casings, plungers mounted to move through the posts and adapted to lock the headlights against pivotal movement, horizontally movable links pivotally connecting the plungers with the lower end of the reflectors, and means for manually moving the plungers.

2. The combination with an automobile, a rod fixed to the automobile, hollow posts fixed to the rod, headlight casings having rotary mounting on the posts, devices connecting the headlight casings and causing them to move together, means operated by the steering mechanism to cause pivotal movement of the headlights on the posts, reflectors in the headlights having horizontal trunnions at their opposite sides mounted in the headlights, springs connecting the upper portions of the reflectors with the casings, plungers mounted to move through the posts and adapted to lock the headlights against pivotal movement, horizontally movable links pivotally connecting the plungers with the lower ends of the reflectors, levers mounted in the posts and engaging the plungers, and manually controlled means connected to the levers whereby the plungers can be manually moved to lock the headlight casings to the posts and to tilt the reflectors in the headlights.

HAROLD SCHJOTZ.
CHRISTIAN STAUGAARD.
FREDRICK SCHLUETER.